United States Patent
Cook et al.

(10) Patent No.: US 9,253,023 B2
(45) Date of Patent: Feb. 2, 2016

(54) NETWORK MANAGEMENT SYSTEM WITH A SWITCHABLE FLOOD REVENTION MODE PREGARDING FAULT EVENTS FOR A MANAGED DEVICE

(75) Inventors: Stephen F. Cook, London (GB); David R. Franklin, London (GB)

(73) Assignee: International Business Machines Corporation, Armonk, NY (US)

(*) Notice: Subject to any disclaimer, the term of this patent is extended or adjusted under 35 U.S.C. 154(b) by 81 days.

(21) Appl. No.: 14/237,332

(22) PCT Filed: Aug. 1, 2012

(86) PCT No.: PCT/IB2012/053934
§ 371 (c)(1),
(2), (4) Date: Feb. 5, 2014

(87) PCT Pub. No.: WO2013/021316
PCT Pub. Date: Feb. 14, 2013

(65) Prior Publication Data
US 2014/0173109 A1  Jun. 19, 2014

(30) Foreign Application Priority Data
Aug. 10, 2011  (EP) .................................... 11177088

(51) Int. Cl.
G06F 15/173 (2006.01)
H04L 12/24 (2006.01)
H04L 12/26 (2006.01)

(52) U.S. Cl.
CPC .............. *H04L 41/06* (2013.01); *H04L 41/044* (2013.01); *H04L 41/0627* (2013.01); *H04L 41/069* (2013.01); *H04L 41/0695* (2013.01); *H04L 43/16* (2013.01)

(58) Field of Classification Search
USPC .................................. 709/204, 205, 223, 224
See application file for complete search history.

(56) References Cited

U.S. PATENT DOCUMENTS 7,120,819 B1 * 10/2006 Gurer et al. .................... 714/4.2
7,131,037 B1   10/2006 LeFaive et al.
(Continued)

FOREIGN PATENT DOCUMENTS

GB        2412539 A    9/2005
KR   20010057827 A    7/2001
(Continued)

OTHER PUBLICATIONS

International Search Report and Written Opinion, dated Jan. 17, 2013, regarding Application No. PCT/IB2012/053934, 7 pages.
(Continued)

*Primary Examiner* — Liangche A Wang
(74) *Attorney, Agent, or Firm* — Yee & Associates, P.C.; Joseph Petrokaitis (57) ABSTRACT

A network management system comprises a server connected to a plurality of probes, each probe connected to one or more managed devices. A method of operating the system comprises the steps of receiving fault events for the managed devices at the probes, detecting that the rate of received fault events has reached or is approaching an overload level for the server, identifying a managed device contributing to the reached or approached overload level, switching the probe for the identified managed device to a flood prevention mode, and operating the switched probe in the flood prevention mode thereby combining multiple fault events for the identified managed device into a single fault event for transmission to the server.

12 Claims, 6 Drawing Sheets

(56) References Cited

U.S. PATENT DOCUMENTS

| | | | |
|---|---|---|---|
| 7,318,178 B2 | 1/2008 | Steinberg et al. | |
| 7,472,314 B2 * | 12/2008 | Bejerano et al. | 714/47.2 |
| 7,653,705 B2 * | 1/2010 | Gudipaty et al. | 709/218 |
| 2004/0120250 A1 * | 6/2004 | Langevin et al. | 370/216 |
| 2008/0126878 A1 * | 5/2008 | Best et al. | 714/45 |

FOREIGN PATENT DOCUMENTS

| | | |
|---|---|---|
| WO | WO2010062435 A1 | 6/2010 |
| WO | WO2010074630 A1 | 7/2010 |
| WO | WO2013021316 A1 | 2/2013 |

OTHER PUBLICATIONS

Lefebvre et al., "A Network Management Framework Using Mobile Agents," Journal of Computer Science, vol. 2, No. 8, Aug. 2006, pp. 646-659.

* cited by examiner

NETWORK MANAGEMENT SYSTEM WITH A SWITCHABLE FLOOD REVENTION MODE PREGARDING FAULT EVENTS FOR A MANAGED DEVICE

This Application is a continuation of and claims priority under 35 U.S.C. §371 to International Application No. PCT/IB2012/053934 filed on Aug. 1, 2012, which claims priority to European Patent Office Application No. EP11177088.9 filed on Aug. 10, 2011. The contents of both aforementioned applications are incorporated herein by reference.

DESCRIPTION

1. Technical Field

This invention relates to a method of operating a network management system and to the network management system itself. In one embodiment, the invention provides advanced event flood protection for network management systems.

2. Background Information

Many computing systems comprise a large network of connected devices that together provide one or more services to external clients. The computing devices that comprise the system may include servers and storage devices, for example. In order to monitor the operation of such systems, it is common to use a network management system to monitor various aspects of the operation of the computing system, including the occurrence of faults within the system. There are a number of network management systems available. These systems gather fault information from disparate devices across a network and then correlate, categorize, prioritize and present this fault information in a form that allows an operator to manage the network and repair the network efficiently.

One of the problems with managing very large networks is that there are network failure modes that can result in a very large number of fault events being generated, particularly when a network cascade failure occurs. The high number of generated fault events can flood the network management system with a huge number of fault events, making the network management system unresponsive and difficult for an operator to isolate the original cause of the failure or to prioritize the repair effort efficiently. One or more devices within the computing network may generate a very large number of fault events in a short space of time, and these fault events will flood the management system with fault events that cannot be efficiently processed and/or will impede the response to the failures. U.S. Pat. No. 7,120,819 B1 (Gürer, D, et al "Method and System for Fault Diagnosis in a Data Network", 10 Oct. 2006) discloses a method and system of automating the process of determining faults in a data network.

In some network management systems this problem is addressed by shutting down a monitoring probe, which may be gathering data from multiple devices, once the fault event rate exceeds a given threshold, and then restarting the probe once the level drops back below the threshold. However, this provides a very crude solution to the problem, as the shutting down of a probe results in a large amount of data loss including information that may be vital to fixing the network. Additionally, if the probe is monitoring multiple devices then all data from all monitored devices is lost, even if only one of the monitored devices is producing the flood of fault events.

Therefore, there is a need in the art to address the aforementioned problems associated with a flood of events.

SUMMARY

According to a first aspect of the present invention, there is provided a method of operating a network management system, the system comprising a server connected to a plurality of probes, each probe connected to one or more managed devices, the method comprising the steps of receiving fault events for the managed devices at the probes, detecting that the rate of received fault events has reached or is approaching an overload level for the server, identifying a managed device contributing to the reached or approached overload level, switching the probe for the identified managed device to a flood prevention mode, and operating the switched probe in the flood prevention mode thereby combining multiple fault events for the identified managed device into a single fault event for transmission to the server.

According to a second aspect of the present invention, there is provided a network management system comprising a server connected to a plurality of probes, each probe connected to one or more managed devices, the system arranged to receive fault events for the managed devices at the probes, detect that the rate of received fault events has reached or is approaching an overload level for the server, identify a managed device contributing to the reached or approached overload level, switch the probe for the identified managed device to a flood prevention mode, and operate the switched probe in the flood prevention mode thereby combining multiple fault events for the identified managed device into a single fault event for transmission to the server.

According to a third aspect of the present invention, there is provided a computer program product on a computer readable medium for operating a network management system, the system comprising a server connected to a plurality of probes, each probe connected to one or more managed devices, the product comprising instructions for receiving fault events for the managed devices, detecting that the rate of received fault events has reached or is approaching an overload level for the server, identifying a managed device contributing to the reached or approached overload level, switching the probe for the identified managed device to a flood prevention mode, and operating the switched probe in the flood prevention mode thereby combining multiple fault events for the identified managed device into a single fault event for transmission to the server.

Viewed from a further aspect, the present invention provides a computer program product for operating a network management system, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Owing to the invention, it is possible to provide a network management system that implements a more intelligent method of reducing the amount of event data from a malfunctioning device. In flood prevention mode, a probe will buffer data from a particular device and periodically produce a single summary event that encapsulates the information from the buffered multiple fault events. This can be done by grouping similar events, for example. In the simplest form of the improved system, the probe performs a de-duplication function before the probe transmits any events. An appropriate network management action can be taken subsequently as a result of detecting the flood of events. In a more complex form, event compression is achieved by finding events with a large number of identical columns and encoding the differences into a single summary event. In one embodiment, the external control of which probe is placed into event compression mode or back into normal mode is achieved using a bi-directional communications system from an aggregate server.

In an alternative form of the network management system, the probe will start to reduce the amount of event data automatically if the amount of received fault events exceeds an upper volume of events. The device feeds that will be placed in event reduction mode can be selected on event volume or can be weighted so that more important devices are less likely to have their event rates reduced. In another alternative form of the network management system, the probe will also check on the load on the server before triggering flood protection/prevention mode to make sure it is required.

BRIEF DESCRIPTION OF THE DRAWINGS

The present invention will now be described, by way of example only, with reference to preferred embodiments, as illustrated in the following figures.

DETAILED DESCRIPTION OF THE INVENTION

Figure 1:
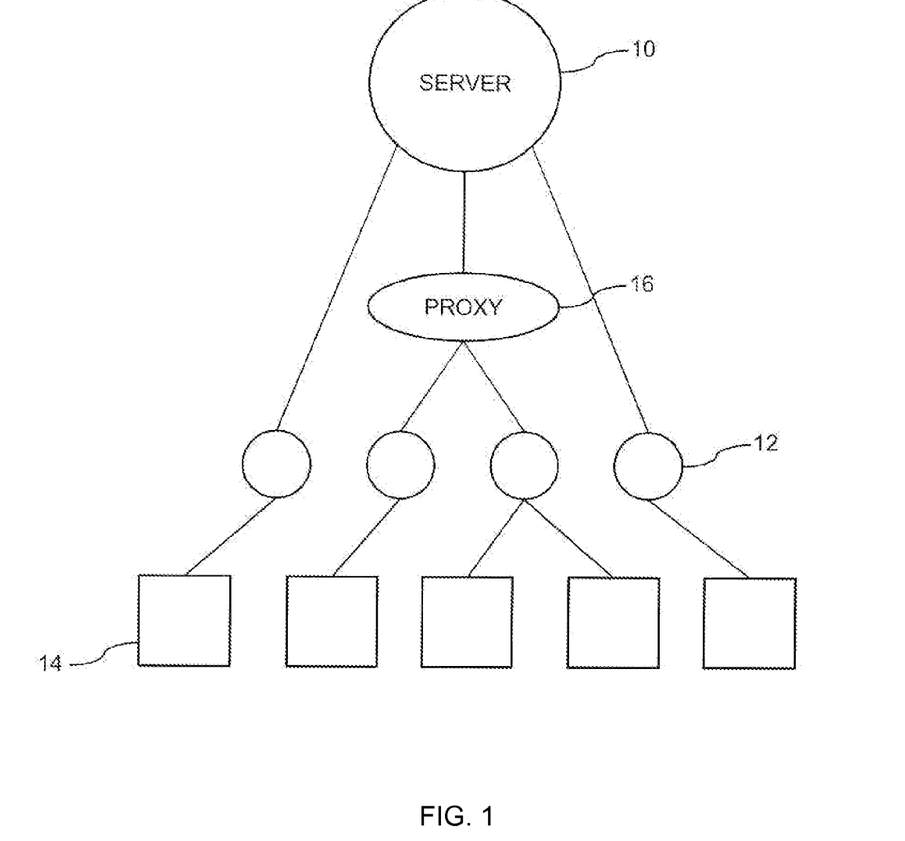
FIG. 1 is a schematic diagram of a network management system in accordance with the prior art, and in which a preferred embodiment of the present invention may be implemented.

FIG. 1 shows a network management system. The system comprises a server 10 connected to a plurality of probes 12, each probe 12 connected to one or more managed devices 14. The system also includes a proxy server 16, which illustrates that a probe 12 is not necessarily connected directly to the server 10, but may connect via the intermediary of the proxy server 16. A probe 12 may be a software component which can be located directly on a device 14 or on a different device connected to a managed device 14. The connections between components shown in the Figure may be via a local or wide-area network, depending upon the topology of the system.

The managed devices 14 may be one of many different types of devices, including servers, storage devices, racks of storage devices, network devices or software components such as other management systems, for example element management systems (EMS) or network management systems (NMS). The managed devices 14 form part of a computing system which is designed to serve external clients with some service. The devices 14 may make up the computing network of a large organization, for example, or may be a computing system supporting a large and complex website serving the general public, such as the website of a financial institution. The devices 14 may be handling many thousands of requests a second and the number and complexity of the requests being served by the devices 14 mean that faults can and do occur.

When any device 14 generates a fault, for example through the failure to complete a client request properly, then the specific managed device 14 will communicate with the probe 12 that is responsible for the device 14 that generated the fault. The probe 12 will then create a fault event, according to specific rules, which will be sent to the server 10, either directly, or via the proxy server 16. Since a single probe 12 may be gathering data from multiple devices 14, then the fault events generated by a probe 12 may be for different devices 14. An administrator has access to the server 10 and can review the fault events received from the probes 12 via a suitable graphical user interface to the server 10.

Figure 2:
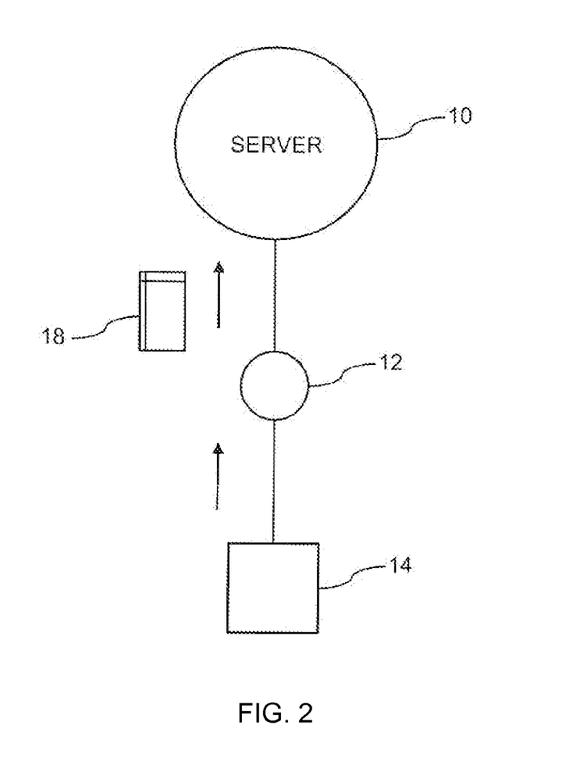
FIG. 2 is a schematic diagram of part of the network management system including a fault event, according to a preferred embodiment of the present invention.

A probe 12 is a monitoring component that can process raw fault or resolution data from one or more devices 14. As shown in FIG. 2, the received faults/resolutions are converted into fault events 18, according to a predefined set of rules, which have a standard set of columns. The rules also govern which destination tables the events 18 should be written to in one or more central databases, maintained by the server 10. Once the events 18 have been converted into the standard column format they are placed onto message queues, one for each destination table. Separate threads then transmit this data to the relevant target database table. If the destination database if offline the data is stored in a file until the database is available again and the data is then transmitted.

The probe 12 is configured so that it has different modes of operation. These different modes are governed by different rule sets to which the probe 12 has access. The probe 12 can be switched between the different modes of operation. This switching can be instructed from the server 10 or the probe 12 can be configured so that it is capable of performing the switch itself between modes, based upon the probe 12 responding to specific circumstances. In a basic, normal mode of operation, the probe 12 will create a fault event 18 whenever a fault indication is received from a device 14. In a flood prevention mode, some form of compression will be used, discussed in more detail below.

The different modes of operation for a probe are specific to the managed device 14 to which the probe 12 is connected. This means that if the probe 12 is connected to multiple managed devices 14, then the probe 12 could be operating in different modes for the different devices 14. So a probe 12 that is connected to two different managed devices 14 could be operating in the flood prevention mode for a first device 14 and could be operating in the basic mode for a second device 14. A probe 12 can switch back and forth between the different modes depending upon the instructions received from the server 12 or on its own decision making process.

When a probe 12 is placed into the flood prevention mode for a specific device 14 for which the probe 12 is responsible, the probe 12 will combine multiple fault events 18 for the specific managed device 14 into a single fault event for transmission to the server 10. This can be achieved in a number of ways, for example by only transmitting every nth fault event 18 or by compressing multiple similar fault events 18 into a single fault event 18, etc. The important point for the probe 12 in flood prevention mode for a managed device 14 is that the probe 12 reduces the number of fault events 18 that are transmitted to the server 10, in relation to that specific device 14.

Figure 3:
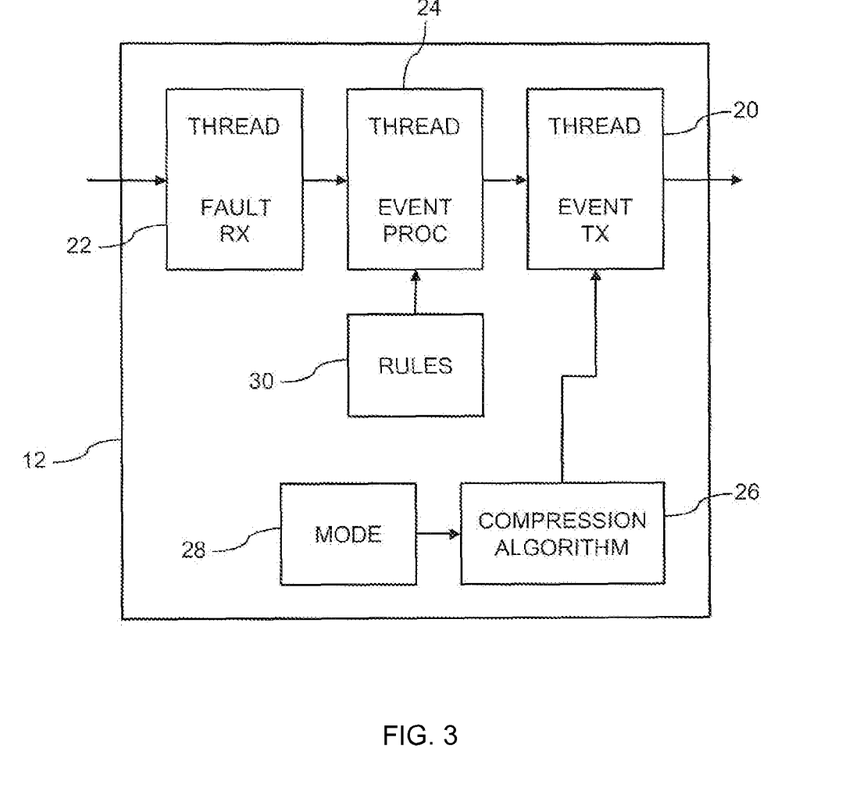
FIG. 3 is a schematic diagram of a probe of the network management system, according to a preferred embodiment of the present invention.

More detail of a probe 12 is shown in FIG. 3. The new event reduction algorithm is run within an event transmission thread 20 within the probe 12. This means that when the probe 12 is running in the flood prevention mode it will not slow down a fault receiving thread 22 nor an event processing thread 24. An algorithm 26 is switched by the mode 28. Furthermore, as the majority of the work performed by the event transmission thread 20 is concerned with database communication, then reducing the number of events 18 will speed up the overall performance of the probe 12 at the expense of increasing event latency. The rules 30 used for creating the events 18 are also shown in this Figure.

In a first embodiment of the system, the probe 12 will have a hash table of one or more devices 14 that have been placed in flood prevention mode. The contents of the table, which can be stored alongside the mode 28, will be sent to the probe 12 by the server 10. In a hierarchical system using multiple servers 10, a server 10 that aggregates the data will be the component of the system to control the probes 12 in this way, as this is the component that would be overwhelmed by an event flood first (discussed in more detail below with reference to FIG. 5). The managed devices 14 are identified by their node, i.e. the hostname on the network.

The following pseudo-code describes the new functionality added to the probe transmission thread 20.

1. Read event data from rules file processing thread message queue.
2. Is node column of the fault event in the flood prevention hash table?
3. If yes then write fault event to a device specific buffer, stored as a pointer list and go to 5.
4. Write event to server table as normal.
5. Has a configurable buffer interval time expired (set in a probe execution properties file)?
6. If no go to 1.

Steps 7 to 20 are performed on each device buffer in turn.

7. Parse the fault event buffer and de-duplicate the events i.e. all events that are the same are turned into a single event with a tally column equal to the number of events.
8. Delete the identical events from the buffer.
9. Is the resulting number of events in the buffer lower than the threshold (set in the probe execution properties file)?
10. If yes write the buffer of events to the server table and go to 1.
11. Parse the fault event buffer and find events with a minimum number of matching columns. For example, all but Identifier, Event type, Time and Summary are the same. Start with the first two similar events found in the buffer.
12. Have any similar events been found?
13. If no write the remaining buffer of events to the server table and go to 1.
14. Create a special summary event. All the identical columns are stored in the new event.
15. Add the non-identical event information from the list of similar events to the flexible extended attribute column of the summary event.
16. Write the summary event to the server table.
17. Delete the list of similar events from the buffer.
18. Is the resulting number of events in the buffer lower than the threshold (set in probe execution properties file)?
19. If yes write the remaining buffer of events to the server table and go to 1.
20. Go to 11.

The controlling server 10 may periodically write a new list of devices to be put into flood prevention mode. This may contain more or fewer devices.

In an alternative embodiment of the system, the probe 12 puts devices into flood prevention mode automatically. The following pseudo-code describes how this is done in the rules file processing thread.

1. Initialization. When the probe rules file is read also read a table of device priority weights if available. A weight of zero will result in the device never being put into flood prevention mode. A missing device will effectively have a default weight of one.
2. Process incoming fault events as before.
3. Record the incoming fault event rate per device.
4. Has the flood adjustment period expired?
5. If no go to 2.
6. Calculate the incoming fault event rate for all devices.
7. Is the fault event rate greater than the maximum threshold (set in probe execution properties file)?
8. If no go to 16.
9. Multiply the fault event rate per device by its weighting in the priority table if it exists.
10. Sort the device list on event rates.
11. Find the device with the highest weighted event rate that is not already in flood prevention mode or has a weight of zero and set it to flood prevention mode. If there is none log it and go to 2.
12. Subtract the device fault event rate from the incoming event rate for all devices.
13. Is the fault event rate greater than the maximum threshold?
14. If no go to 2.
15. Go to 11.
16. Is the fault event rate for all devices less than half the maximum threshold (set in probe execution properties file)?
17. If no go to 2.
18. Multiply the fault event rate per device by its weighting in the priority table if it exists.
19. Sort the device list on fault event rates.
20. Find the device (if it exists) with the lowest weighted fault event rate that is in flood prevention mode and turn off flood prevention mode.
21. Go to 2.

In another alternative embodiment of the system, the probe 12 can query the server 10 to see how heavily loaded it is before the probe 12 starts to put devices 14 into flood prevention mode. This could be done by timing how long a query to the server 10 takes to return data or it could be done by querying performance metrics recorded by the server 10, for example by selecting sum(PeriodSQLTime) from catalog.profiles and select sum(PeriodTime) from catalog.trigger_stats, if using ObjectServer in IBM® Netcool® Network Management. If the average of either of these metrics exceeds a given threshold, as well as the total fault event rate being above its threshold, then the probe 12 starts to put devices 14 into flood prevention mode based on the weighted fault event rates. This allows for times when the server 10 has very little load from other probes 12 and users and so can handle the high event rate from this probe 12. IBM and Netcool are trademarks of International Business Machines Corporation, registered in many jurisdictions worldwide.

The ObjectServer de-duplication trigger can be modified to add together incoming fault event tallies so that the correct tally is recorded for fault events 18 that have already been partly de-duplicated at the probe 12 over the buffer interval time. This also ensures that fault event rate calculations (based on the tally) will remain correct. In IBM Netcool 7.3.1 the probe 12 does not set the tally column. A tool will be provided for the IBM Netcool fault event lists that will unpack summary events if required. This will allow a user to recreate the full list of events from the device 14 should it be required. This uses the extended attribute column data along with the rest of the summary column data to produce the new events. The summary event will then be deleted.

Figure 4:
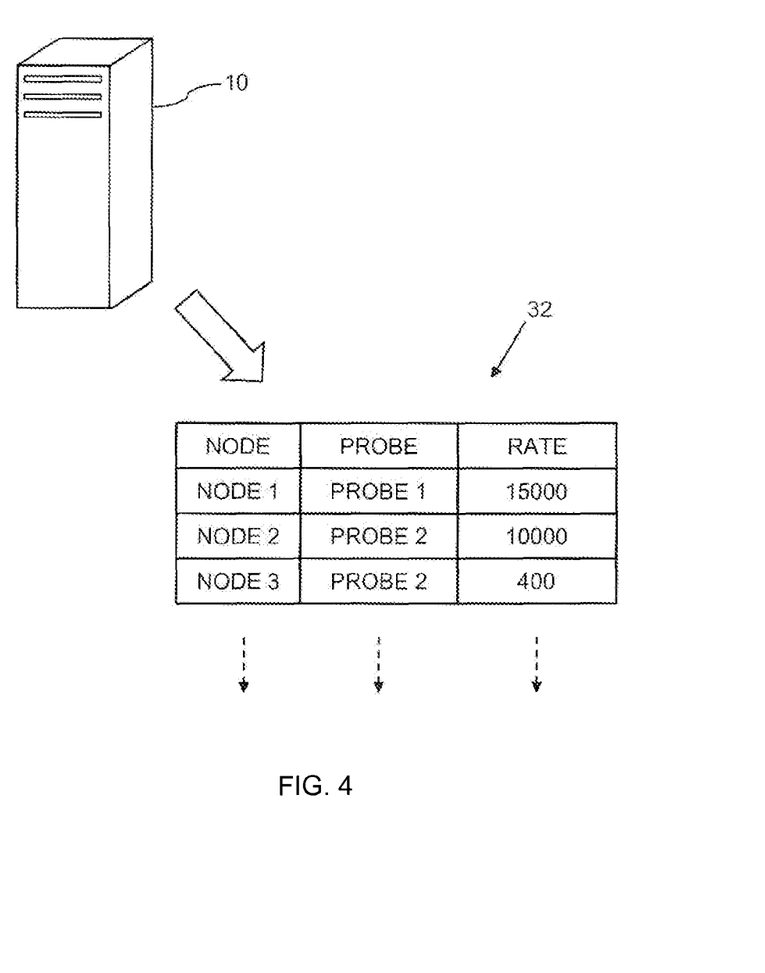
FIG. 4 is a schematic diagram of a server of the network management system, according to a preferred embodiment of the present invention.
Figure 6:
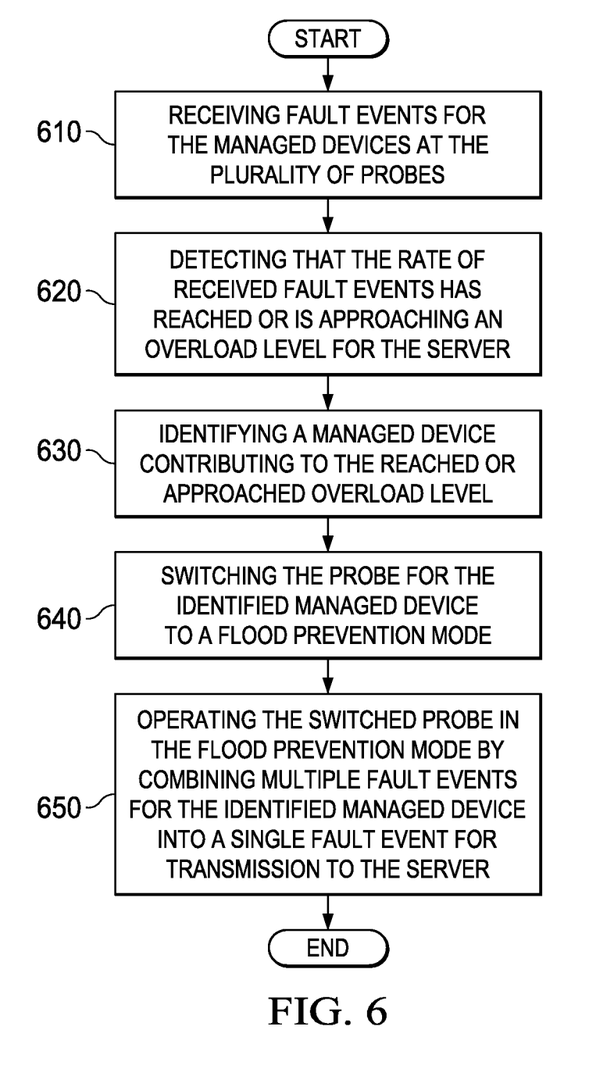
FIG. 6 is a flow diagram of a network management system that supports a flood prevention mode by combining multiple fault events for an identified managed device into a single fault event for transmission to a server.

FIG. 4 shows an example of a server 10, which is connected to the probes 12 and/or the proxy server(s) 16. The server 10 receives fault events 18 for the managed devices 14 from the probes 12 (FIG. 6, element 610) and, in one embodiment, detects that the rate of received fault events 18 has reached or is approaching an overload level for the server 10 (FIG. 6, element 620). The server 10 can be programmed with a threshold level that defines an overload level for the specific server 10. This threshold can be expressed as rate of receipt of fault events 18 per second, for example. When this threshold has been reached or the rate of receipt is increasing such that the threshold will be reached within a predetermined time period, then the server 10 will take action.

The server 10 will identify a managed device 14 contributing to the reached or approaching overload level (FIG. 6, element 630) and will switch the probe 12 for the identified managed device 14 into a flood prevention mode (FIG. 6, element 640). This can be achieved by creating a list 32 of fault event rates per managed device 14 and selecting the managed device 14 with the greatest fault event rate. The table 32 defines the devices 14 (represented by node name), the probe 12 responsible for the specific device 14, and also a rate of receipt of fault events 18 per second for the particular device 14. Each row of the table 32 relates to a different managed device 14.

In the example of FIG. 4, with a threshold of <15000 fault events/second, the device "node 1" would be placed in flood prevention mode, which would involve instructing "probe 1" to switch to flood prevention mode for that specific device 14 (FIG. 6, element 650). More complex strategies are possible, and additional devices 14 can be placed into flood prevention mode at the same time, if it is calculated that changing "node 1" will not provide sufficient protection for the server 10. Indeed it is quite possible that a large number of devices 14 will need to be placed into flood prevention mode. Once the server 10 is no longer likely to be overloaded, then the process can be reversed and devices 14 can be taken out of flood prevention mode.

Figure 5:
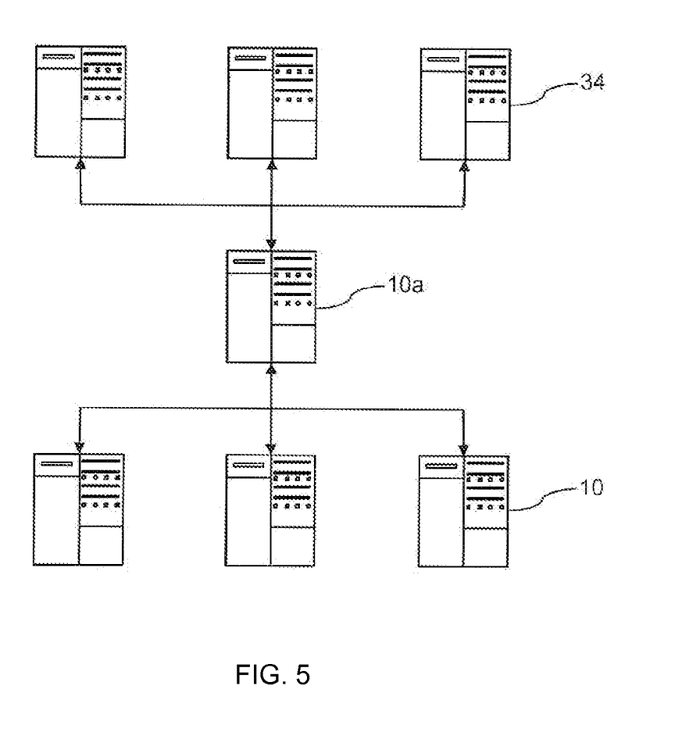
FIG. 5 is a schematic diagram of a second embodiment of the network management system according to a preferred embodiment of the present invention.

A second embodiment of the network management system is shown in FIG. 5. This embodiment uses an aggregation server 10a, mentioned above in passing. This type of embodiment will be used in very large systems that use so many devices that it is impractical to have a single server 10 connected to all of the probes 12. In this embodiment, a plurality of servers 10 form a collection layer within the system, and each of the servers 10 in the collection layer is connected to multiple probes 12 which are themselves connected to one or more managed devices 14. Display servers 34 form a display layer within the network management system.

Faults generated by the managed devices 14 are communicated to the probe 12 that is connected to the specific device 14 that generated an error message. The probe 12 creates a formatted event message 18 as per the rules under which the probe 12 is operating. This event message 18 is transmitted to a server 10 in the collection layer and the collection layer servers 10 communicate with the aggregation server 10a. Event messages 18 that have been de-duplicated are passed up to the aggregation server 10a. The servers 10 also delete expired events and perform pre-processing before sending the events on to the server 10a. Therefore the aggregation server 10a gets the amalgamated fault events and has reduced load than if it had to perform this stage itself. The server 10a will create error reports and database entries which are passed to the display servers 34 so that an administrator can access the information without increasing the load on the aggregation server 10a.

The detection that the rate of received fault events 18 has reached or is approaching an overload level is measured relative to the aggregation server 10a. This is the component within the system that is in danger of being overloaded when there is a flood of fault events 18. Once the aggregation server 10a detects that the overload level is reached or about to be reached, then the process of placing some probes 12 into flood prevention mode for specific managed devices 14 will begin, as discussed in detail above. In this way, the aggregation server 10a is protected from fault events 18 flooding the aggregation server 10a, thereby preventing the aggregation server 10a from being able to operate properly.

The improved network management system can take the form of an entirely hardware embodiment, an entirely software embodiment or an embodiment containing both hardware and software elements. In the preferred embodiment, the network management system is implemented in software, which includes but is not limited to firmware, resident software, microcode, etc. The network management system can take the form of a computer program product accessible from a computer-usable or computer-readable medium providing program code for use by or in connection with a computer or any instruction execution system.

For the purposes of this document, a computer usable or computer readable medium can be any apparatus that can contain, store, communicate, propagate, or transport the program for use by or in connection with the instruction execution system, apparatus or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The invention claimed is:

1. A method of operating a network management system, the network management system comprising a server connected to a plurality of probes, with each probe of the plurality of probes connected to one or more managed devices, the method comprising the steps of:
   receiving fault events for the managed devices at the plurality of probes;
   detecting that the rate of received fault events has reached or is approaching an overload level for the server;
   identifying a managed device contributing to the reached or approached overload level;
   switching the probe for the identified managed device to a flood prevention mode; and
   operating the switched probe in the flood prevention mode by combining multiple fault events for the identified managed device into a single fault event for transmission to the server.

2. A method according to claim 1, wherein the step of identifying a managed device contributing to the reached or approached overload level is carried out by each individual probe.

3. A method according to claim 1, wherein the step of identifying a managed device contributing to the reached or approached overload level is carried out by the server and the step of switching the probe for the identified managed device to a flood prevention mode comprises instructing the probe to switch to the flood prevention mode.

4. A method according to claim 3, wherein the step of identifying a managed device contributing to the reached or approached overload level comprises creating a list of fault event rates per managed device and selecting the managed device with the greatest fault event rate.

5. A method according to claim 3 further comprising:
after detecting that the rate of received fault events has reached or is approaching an overload level for the server, identifying one or more further managed devices contributing to the reached or approached overload level and switching the probe for the further identified managed devices to a flood prevention mode.

6. A network management system comprising a server connected to a plurality of probes, each probe of the plurality of probes connected to one or more managed devices, the network management system configured to receive fault events for the managed devices at the plurality of probes; detect that the rate of received fault events has reached or is approaching an overload level for the server; identify a managed device contributing to the reached or approached overload level; switch the probe for the identified managed device to a flood prevention mode; and operate the switched probe in the flood prevention mode thereby combining multiple fault events for the identified managed device into a single fault event for transmission to the server.

7. A system according to claim 6, wherein each individual probe is configured to identify a managed device contributing to the reached or approached overload level.

8. A system according to claim 6, wherein the server is configured to identify a managed device contributing to the reached or approached overload level and switch the probe for the identified managed device to a flood prevention mode by instructing the probe to switch to the flood prevention mode.

9. A system according to claim 8, wherein the server is configure to, when identifying a managed device contributing to the reached or approached overload level, create a list of fault event rates per managed device and select the managed device with the greatest fault event rate.

10. A system according to claim 8, wherein the server is further configured to, responsive to detecting that the rate of received fault events has reached or is approaching an overload level for the server, identify one or more further managed devices contributing to the reached or approached overload level and switch the probe for the further identified managed devices to a flood prevention mode.

11. A computer program product for operating a network management system, the computer program product comprising:
a non-transitory computer readable storage medium readable by a processing circuit and having stored thereon instructions for execution by the processing circuit for performing the method of claim 1.

12. A computer program stored on a non-transitory computer readable storage medium and loadable into the internal memory of a digital computer, comprising software code portions, when said computer program is run on a computer, for performing the method of claim 1.

* * * * *